(12) United States Patent
Seibert et al.

(10) Patent No.: US 10,514,844 B2
(45) Date of Patent: Dec. 24, 2019

(54) AUTOMATICALLY MODIFYING AN INPUT AREA BASED ON A PROXIMITY TO ONE OR MORE EDGES

(71) Applicant: Dell Products L. P., Round Rock, TX (US)

(72) Inventors: Philip M. Seibert, Austin, TX (US); Jace W. Files, Round Rock, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 15/352,826

(22) Filed: Nov. 16, 2016

(65) Prior Publication Data

US 2018/0136822 A1    May 17, 2018

(51) Int. Cl.
*G06F 3/0488* (2013.01)
*G06F 3/041* (2006.01)
(Continued)

(52) U.S. Cl.
CPC ........ *G06F 3/04886* (2013.01); *G06F 3/0383* (2013.01); *G06F 3/03545* (2013.01);
(Continued)

(58) Field of Classification Search
CPC . G06F 3/04886; G06F 3/04883; G06F 3/0416
See application file for complete search history.

(56) References Cited

U.S. PATENT DOCUMENTS 5,644,653 A * 7/1997 Sunakawa ............. G06F 1/1626
382/187
6,323,846 B1 * 11/2001 Westerman ........... G06F 3/0235
345/173
(Continued)

OTHER PUBLICATIONS

How Stuff Words (How do touchscreen monitors know where you're touching?, posted at [https://computer.howstuffworks.com/question716.htm], publically available Jun. 5, 2003, retrieved from the Internet Archive on [Jan. 23, 2019]. 2 pages. (Year: 2003).*

(Continued)

*Primary Examiner* — Amy M Levy
(74) *Attorney, Agent, or Firm* — Campbell Stephenson LLP; Shiv S. Naimpally

(57) ABSTRACT

In some implementations, a computing device may receive input in an input area displayed on a touchscreen display device of a computing device. The computing device may receive touch data associated with one or more limbs of a user resting on a surface of the touchscreen display device and determine that at least one point of the touch data is within a predetermined distance from an edge of the touchscreen display device. The computing device may modify the input area to create a modified input area, display the modified input area on the touchscreen display device, and receive additional input in the modified input area. When the additional input is received in the modified input area, the at least one point of the touch data may be greater than the predetermined distance from the edge of the touchscreen display device.

20 Claims, 10 Drawing Sheets

(51) Int. Cl.
  *G06F 3/038* (2013.01)
  *G06F 3/0354* (2013.01)
(52) U.S. Cl.
  CPC ........ *G06F 3/0416* (2013.01); *G06F 3/04883* (2013.01); *G06F 2203/04808* (2013.01)

(56) References Cited

U.S. PATENT DOCUMENTS

| | | | | |
|---|---|---|---|---|
| 6,831,631 | B2* | 12/2004 | Chuang | G06F 3/0488 178/18.01 |
| 7,203,903 | B1 | 4/2007 | Thompson | 382/187 |
| 7,567,239 | B2 | 7/2009 | Seni | 345/173 |
| 8,108,016 | B2 | 1/2012 | Gaddy | 16/223 |
| 8,660,978 | B2* | 2/2014 | Hinckley | G06F 3/038 706/52 |
| 8,749,484 | B2 | 6/2014 | de Paz | 345/156 |
| 8,760,426 | B1* | 6/2014 | Strand | G09G 5/00 345/169 |
| 8,801,196 | B2 | 8/2014 | Sawada | 353/94 |
| 8,830,203 | B2* | 9/2014 | Sultenfuss | G06F 3/044 345/173 |
| 8,872,731 | B2 | 10/2014 | Gimpl | 345/1.3 |
| 8,963,857 | B2 | 2/2015 | Kim et al. | 345/173 |
| 9,013,368 | B1 | 4/2015 | Kim et al. | 345/1.1 |
| 9,250,851 | B2 | 2/2016 | Lu | |
| 9,348,497 | B2 | 5/2016 | Miyano | 345/173 |
| 9,785,272 | B1* | 10/2017 | Rosenberg | G06F 3/0414 |
| 2002/0126126 | A1 | 9/2002 | Baldwin | 345/557 |
| 2003/0210817 | A1 | 11/2003 | Hullender | 382/187 |
| 2004/0153974 | A1 | 8/2004 | Walker | 715/210 |
| 2004/0196273 | A1* | 10/2004 | Mitsumura | G09G 5/00 345/204 |
| 2005/0204310 | A1* | 9/2005 | De Zwart | G06F 19/00 715/821 |
| 2006/0139295 | A1 | 6/2006 | Eberhard | 345/101 |
| 2007/0222742 | A1 | 9/2007 | Kimura | 345/102 |
| 2008/0094412 | A1 | 4/2008 | Jiao | 345/621 |
| 2008/0129712 | A1 | 6/2008 | Nguyen | 345/179 |
| 2008/0235578 | A1* | 9/2008 | Heed | G06F 17/30905 715/269 |
| 2008/0238336 | A1 | 10/2008 | Peng | 315/294 |
| 2009/0262079 | A1 | 10/2009 | Bury | 356/169 |
| 2010/0134423 | A1* | 6/2010 | Brisebois | G06F 3/03547 345/173 |
| 2010/0153313 | A1* | 6/2010 | Baldwin | G06F 1/1626 706/11 |
| 2011/0032202 | A1* | 2/2011 | Aoyagi | G06F 1/1626 345/173 |
| 2012/0068948 | A1* | 3/2012 | Tomoda | G06F 3/04886 345/173 |
| 2012/0081400 | A1 | 4/2012 | Schrock | 345/649 |
| 2012/0262407 | A1* | 10/2012 | Hinckley | G06F 3/038 345/173 |
| 2012/0280924 | A1 | 11/2012 | Kummer | 345/173 |
| 2012/0306927 | A1* | 12/2012 | Lee | G06F 3/041 345/660 |
| 2012/0313865 | A1* | 12/2012 | Pearce | G06F 3/0416 345/173 |
| 2013/0076678 | A1 | 3/2013 | Kretz | 345/173 |
| 2013/0285941 | A1* | 10/2013 | Sugiura | G06F 3/017 345/173 |
| 2013/0300672 | A1* | 11/2013 | Griffin | G06F 3/04883 345/173 |
| 2013/0314362 | A1 | 11/2013 | Miyano | 345/173 |
| 2013/0328878 | A1 | 12/2013 | Stahl | 345/428 |
| 2013/0332642 | A1 | 12/2013 | Capezza | 710/304 |
| 2014/0013269 | A1* | 1/2014 | Na | G06F 3/04883 715/780 |
| 2014/0092107 | A1 | 4/2014 | Ferry | 345/520 |
| 2015/0067489 | A1 | 3/2015 | Zotto | 715/268 |
| 2015/0067552 | A1* | 3/2015 | Leorin | G06F 3/0481 715/765 |
| 2015/0084885 | A1* | 3/2015 | Kawamoto | G06F 3/0482 345/173 |
| 2015/0116362 | A1* | 4/2015 | Aurongzeb | H04N 7/15 345/650 |
| 2015/0193141 | A1 | 7/2015 | Goldsmith | 345/173 |
| 2015/0205394 | A1* | 7/2015 | Novak | G06F 3/041 345/173 |
| 2015/0253889 | A1* | 9/2015 | Hyun | G06T 3/60 345/173 |
| 2015/0363035 | A1* | 12/2015 | Hinckley | G06F 3/0383 345/173 |
| 2015/0370455 | A1* | 12/2015 | Van Os | G06F 3/04842 345/173 |
| 2016/0018960 | A1* | 1/2016 | Feng | G06F 3/04883 715/763 |
| 2016/0062634 | A1* | 3/2016 | Kurita | G06F 17/242 715/268 |
| 2016/0077616 | A1* | 3/2016 | Durojaiye | G06F 3/03545 345/173 |
| 2016/0170559 | A1* | 6/2016 | Zeng | G06F 3/04883 345/173 |
| 2016/0182924 | A1 | 6/2016 | Todd | 725/116 |
| 2016/0274722 | A1 | 9/2016 | Putzolu | |
| 2016/0291857 | A1* | 10/2016 | Park | G06F 3/0486 |
| 2016/0321969 | A1 | 11/2016 | Kambhatla | |
| 2017/0060406 | A1* | 3/2017 | Rucine | G06F 3/0236 |
| 2017/0091153 | A1* | 3/2017 | Thimbleby | G06F 17/212 |
| 2017/0336899 | A1* | 11/2017 | Szeto | G06F 1/1692 |
| 2017/0372680 | A1 | 12/2017 | Takashimada | |
| 2018/0095653 | A1* | 4/2018 | Hasek | G06F 3/041 |
| 2018/0113666 | A1 | 4/2018 | Knepper | 345/659 |

OTHER PUBLICATIONS

Knepper, Lawrence E. et al., "Routing Content in a Dual-Display Computing Device"; U.S. Appl. No. 15/334,503, filed Oct. 26, 2016; consisting of Specification, Claims, Abstract, and Drawings (45 pages).

Files, Jace W. et al., "Auto-Scrolling Input in a Dual-Display Computing Device"; U.S. Appl. No. 15/348,119, filed Nov. 10, 2016; consisting of Specification, Claims, Abstract, and Drawings (45 pages).

Files, Jace W. et al., "Backlight Compensation for a Computing Device with Two or More Display Devices"; U.S. Appl. No. 15/364,529, filed Nov. 30, 2016; consisting of Specification, Claims, Abstract, and Drawings (43 pages).

* cited by examiner

AUTOMATICALLY MODIFYING AN INPUT AREA BASED ON A PROXIMITY TO ONE OR MORE EDGES

BACKGROUND OF THE INVENTION

Field of the Invention

This invention relates generally to a computing device having at least one touchscreen display device and, more particularly, to automatically adjusting one or more of a location of an input area, a size of the input area, an angle of the input area, or a size (e.g., scaling) of the input displayed in the input area based on a proximity of the input to one or more edges of the at least one touchscreen display device.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An operating systems may enable a computing device, such as a tablet, to receive input from a stylus being manipulated by a user. However, the user may encounter difficulties when attempting to provide input when the stylus is being manipulated near an edge of the tablet, particularly when the tablet is unsupported or handheld because there is no place on which the user can rest the wrist of the writing hand. For example, the user may encounter difficulties when using a stylus to provide input near an edge of the tablet that is near the user's dominant hand. Such difficulties may degrade the user's experience when providing input on a tablet using a stylus.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations, a computing device may receive input in an input area displayed on a touchscreen display device of a computing device. The computing device may receive touch data associated with one or more limbs of a user resting on a surface of the touchscreen display device and determine that at least one point of the touch data is within a predetermined distance from an edge of the touchscreen display device. The computing device may modify the input area to create a modified input area, display the modified input area on the touchscreen display device, and receive additional input in the modified input area. When the additional input is received in the modified input area, the at least one point of the touch data may be greater than the predetermined distance from the edge of the touchscreen display device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
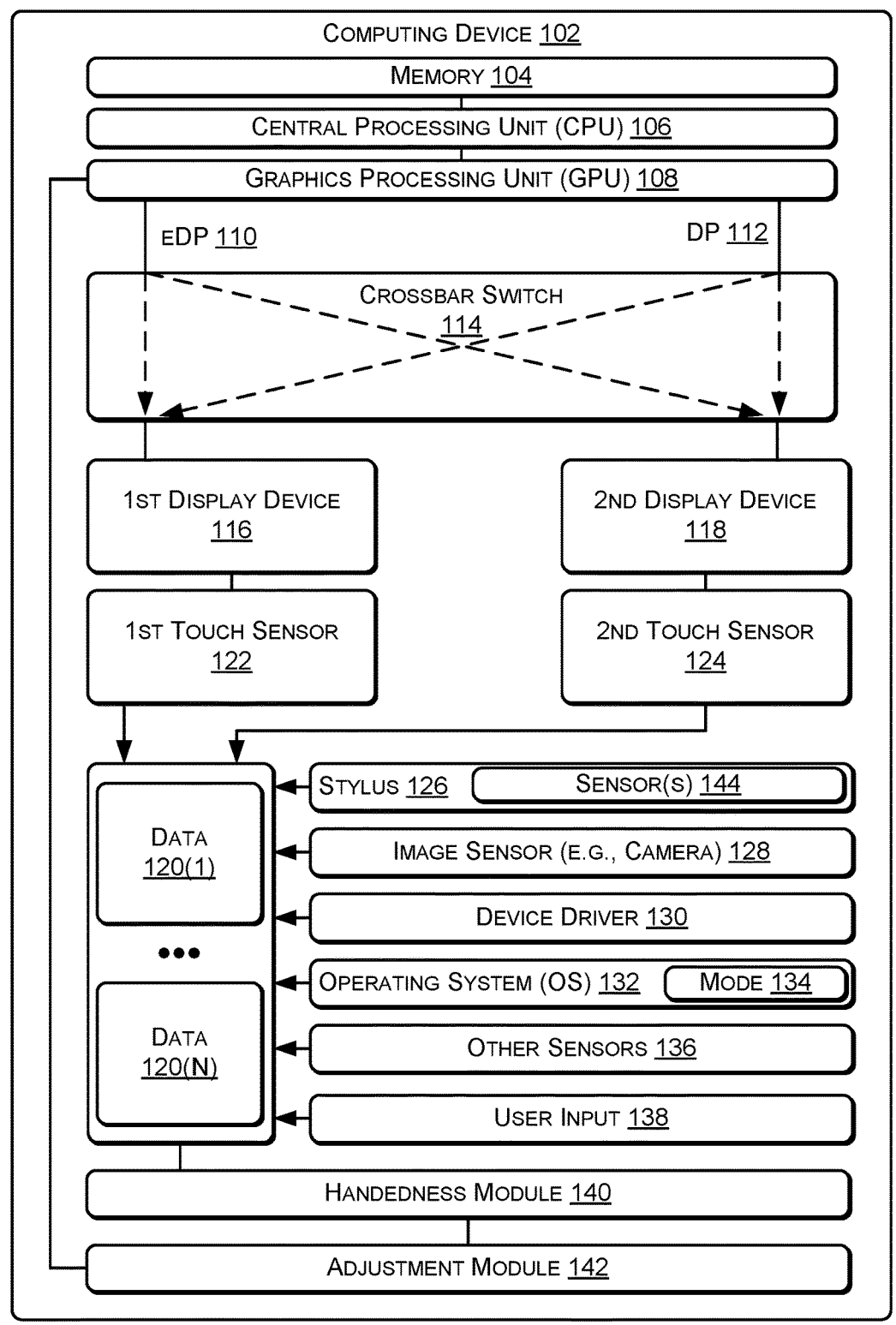
FIG. 1 is a block diagram of an architecture that includes a computing device having a handedness module according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The system and techniques described herein automatically (e.g., without human interaction) move a location of an input area that receives input from a stylus when the user is attempting to provide stylus input near one or more edges of a touchscreen display device of a computing device. For example, when the user provides stylus input, the computing device may gather data from sensors built-in to the computing device and use the data to determine handedness, e.g., determine whether the user is right-handed or left-handed in terms of providing input. The handwriting profile and handedness may be used to identify (e.g., predict) which edge(s) of the touchscreen display device may potentially cause difficulties for stylus input.

A component of the computing device, such as a device driver associated with the stylus, may monitor a location of the stylus on the touchscreen display device. When the device driver (or another component) determines that the stylus is within a predetermined distance from the potentially problematic edge(s) that were previously identified, the device driver may temporarily move a location of the input area on the touchscreen display device by X amount in direction A, Y amount in direction B, or both (where X>0, Y>0, direction A is up or down, and direction B is left or right). For example, when a left-handed person attempts to write in the bottom left corner of the touchscreen display device, the device driver may, based on a user input profile, temporarily move the input area a first amount up and a second amount to the right. Temporarily moving the location of the input area on the touchscreen display device may enable the user to provide stylus input in a comfortable position, e.g., in a position that provides support for the user's hand (e.g., palm or wrist) on the touchscreen display device. After the device driver determines that the stylus input has been completed (e.g., by detecting that the stylus has been lifted off of the touchscreen display device), the device driver may return the input area to a previous (e.g., original) location.

The term stylus refers to any tool (including a user's appendage, such as a finger) that is used to provide input to a touchscreen-enabled device. The stylus may be used to provide graphical input, such as drawings and handwritten input using cursive input, printed input, or a combination of both printed and cursive. The stylus may be a passive (e.g., capacitive) stylus or an active stylus. A passive stylus may be a finger or behave in a manner similar to a finger when touching a touchscreen, e.g., there may not be electronic communication between the passive stylus and the computing device. An active stylus includes electronic components that communicate with the touchscreen display device. The stylus may incorporate a palm rejection technology that temporarily turns off a multi-touch feature of the touchscreen display, thereby allowing the palm to rest on the touchscreen display while still receiving input from the stylus.

When a user provides input using a stylus on a touchscreen device, the input area may be either (1) separate from the application or (2) part of the application. For example, in Microsoft® Windows®, when using a stylus to provide input to an application, such as a document editor or other application that traditionally receives text input from a keyboard, the input area may be separate from the application. The user may provide input by manipulating the stylus in the input area, optical character recognition (OCR) (or a similar technique) may be used to convert the input into text, and the text may be inserted into a text area of the application. The text area may be a location of the application where keyboard input is usually received. In contrast, some applications (e.g., OneNote®) may be capable of receiving and storing stylus input in the same form that the stylus input was entered into the input area. For such applications, the input area may be part of the application (e.g., instead of being distinct and separate from the application). For example, the user may provide stylus input that includes a drawing and cursive (or printed) text in the input area and the application may store the stylus input in the same form (e.g., drawing and cursive text) that the input was entered. In some cases, such applications may enable the user to later select portions of the stored input and perform OCR to convert the stored input into text. The techniques and systems described herein may be used in both situations, e.g., in situations where the input area is separate from the application and in situations where the input area is part of the application.

When a user initiates providing stylus input in an input area of a touchscreen display device that is part of a computing device, the device driver for the stylus may gather data from one or more sensors of the computing device. For example, the sensors may include one or more of an accelerometer, a gyroscope, a magnetometer or a magnetic compass, a proximity sensor, touch input, a stylus, or a camera. To illustrate, the device driver may gather image data from the camera, touch data from the touchscreen display device, stylus (e.g., handwriting) data from the input area of the touchscreen display device, and tilt data from the stylus (e.g., identifying an angle and a direction of the angle of the stylus). The touch data may identify portions of the user's hand (e.g., palm, wrist, and the like) that are touching the touchscreen display device when the user is providing stylus input. The device driver may use the data to determine whether the user is left handed or right handed.

The device driver may determine that, on average, when the user is providing input, a tip of the stylus is X distance in direction A and Y distance in direction B from one or more points of the touch data (e.g., associated with the user's hand). The device driver may determine, that if the tip of the stylus is less than Y distance from the bottom edge of a touchscreen display device or less than X distance from the left edge of a touchscreen display device, then the user may experience discomfort. In response, the computing device may temporarily change (e.g., move) a location (e.g., input area) where the user is providing input. For example, the computing device may temporarily move the location of the input area (a) for a first pre-determined period of time, (b) until the user provides an indication that the user has paused providing input (e.g., by lifting the stylus off the touchscreen display device or by not providing input for more than a second pre-determined period of time), or (c) a combination of both (e.g., the greater of (a) or (b)). For example, the location of the input area may temporarily be moved X+M (M>0) distance from the bottom edge of the touchscreen display device, Y+N (N>0) distance from the left edge of a touchscreen display device, or both X+M and Y+M. M and N may be determined based on the touch data (e.g., by determining a size of the user's hand), a distance of the tip of the stylus to one or more points associated with the touch data, a size of the touchscreen display device, another piece of data, or any combination thereof. After the computing device determines that the user has completed entering input into the input area, the computing device may move the location of the input area back to an original location of the input area. In some cases, the computing device may determine an angle at which the input is being received (e.g., based on a tilt sensor in the stylus) and adjust an angle of the input area (e.g., based on the angle of the input).

FIG. 1 is a block diagram of an architecture 100 that includes a computing device having a handedness module according to some embodiments. A computing device 102 includes a memory 104, a central processing unit 106, and a graphics processing unit 108. The graphics processing unit 108 may be a separate device from the central processing unit 106 or may be incorporated into the central processing unit 106.

The graphics processing unit 108 may include at least two outputs, e.g., an embedded display port (eDP) output 110 and a display port (DP) output 112. The outputs 110, 112 may be sent to a crossbar switch 114 for routing to one or both of a first display device 116 and a second display device 118. The computing device 102 may determine, based on an orientation (e.g., landscape or portrait) and a display mode of the computing device 102, which of the outputs 110 or 112 to route to one or both of the first display device 116 and the second display device 118.

The computing device 102 may be a portable, handheld, tablet computing device. For example, the first display device 116 may be coupled to the second display device 118 by a hinge that enables the first display device 116 to swivel between approximately 0° and approximately 360° relative to the second display device 118. In some cases, a single display device, such as an organic light emitting diode (OLED) display device, may be flexible (e.g., capable of being folded in half) and may be logically divided to create the display devices 116, 118. For example, the flexible display device may be capable of being folded to create the display devices 116, 118. The display devices 116, 118 may be less than 6 millimeters (mm) part from each other.

Various sensors of the computing device 102 may provide data 120(1) to data 120(N) (e.g., where N>1). For example, a first touch sensor 122 may be associated with the first display device 116 and may provide touch sensor data that is included in the data 120. A second touch sensor 124 may be associated with the second display device 118 and may provide touch sensor data that is included in the data 120. A stylus 126 may include one or more stylus sensors 144 to provide tilt data (e.g., from a tilt sensor) indicating an angle at which the stylus is being held, location data identifying a location of a tip of the stylus 126 relative to the display devices 116, 118, pressure data (e.g., from a pressure sensor) indicating an amount of pressure associated with the tip of the stylus 126, other types of stylus sensor data, or any combination thereof.

The computing device 102 may include an image sensor 128 (e.g., a camera or other imaging device) that provides image data that is included in the data 120. A device driver 130 associated with the stylus 126 may provide additional stylus data that is included in the data 120. The computing device 102 may include an operating system 132 that provides data that is included in the data 120. The operating system 132 may have one or more modes 134. For example, the operating system 132, such as Microsoft® Windows®, may provide three display modes 134: (a) an extended desktop mode where the display devices 116, 118 behave as if they were a single display device, (b) clone mode where each of the display devices 116, 118 display the same content, or (c) single display mode, e.g., one of the display devices 116, 118 is off and therefore not displaying any content. Other sensors 136, such as an accelerometer, a magnetometer, a magnetic compass, a gyroscope, a proximity sensor, or another type of sensor may provide data that is included in the data 120.

In some cases, a user may provide user input 138 that provides one of the data items 120 that may be used to determine handedness. For example, the user input 138 may be used to override one or more of the data 120(1) to 120(N).

A handedness module 140 may determine whether input being received in an input area displayed on one or both of the display devices 116, 118 is left-handed input or right-handed input. For example, the handedness module 140 may monitor and analyze the data 120 to create a user input profile. An adjustment module 142 may monitor a location of the input being received in the input area and modify the input area to enable the user to have sufficient support (e.g., for the user's wrist) when providing input via the stylus 126. For example, the adjustment module 142 may modify one or more of a location of an input area, a size (e.g., length, width, or both) of an input area, an angle of the input area, or a size (e.g., scaling) of the input being displayed in the input area. In some cases, the adjustment module 142 may modify the input area by moving the input area from one of the display devices 116, 118 to another of the display devices 116, 118. For example, the adjustment module 142 may modify the input area by moving the input area from the display device 116 to the display device 118 or from the display device 118 to the display device 116.

The way input received in the input area is processed may depend on the type of software application with which the user is interacting. For example, some applications (e.g., Microsoft® Word®) may receive input from a stylus being manipulated by a user in an input area, convert the input into text (e.g., using optical character recognition (OCR)), and display the text in a text area of the application. Other types of applications (e.g., Microsoft® OneNote®) may receive input from the stylus in the input area and store the stylus input in the form that it was received, e.g., without performing character recognition. The user may keep the input stored in the form that it was received or the user may instruct the computing device 102 to perform OCR on the stored input to convert at least a portion of the stored input into text.

Thus, one or more sensors included in a computing device may generate sensor data. The computing device may analyze the sensor data to determine a handedness of the input, e.g., whether the user is providing right-handed input or left-handed input. The handedness of the user may be stored in a user input profile. As the user provides input (e.g., using a stylus) in an input area displayed on one or two display devices of the computing device, the computing device may determine a location of the user's hand (or other limb). If the computing device determines that the user's hand (or other limb) is within a predetermined distance from at least one edge of one of the display devices, the computing device may automatically modify the input area to create a modified input area to receive additional input. The modified input area may be a modified location as compared to an original location of the original input area, a modified size (e.g., a modified length, a modified width, or both) as compared to an original size of the original input area, a modified angle as compared to an original (e.g., horizontal) input area, a modified size (e.g., scaling) of input displayed in the modified input area as compared to the original size of the input displayed in the original input area, or any combination thereof.

Figure 2:
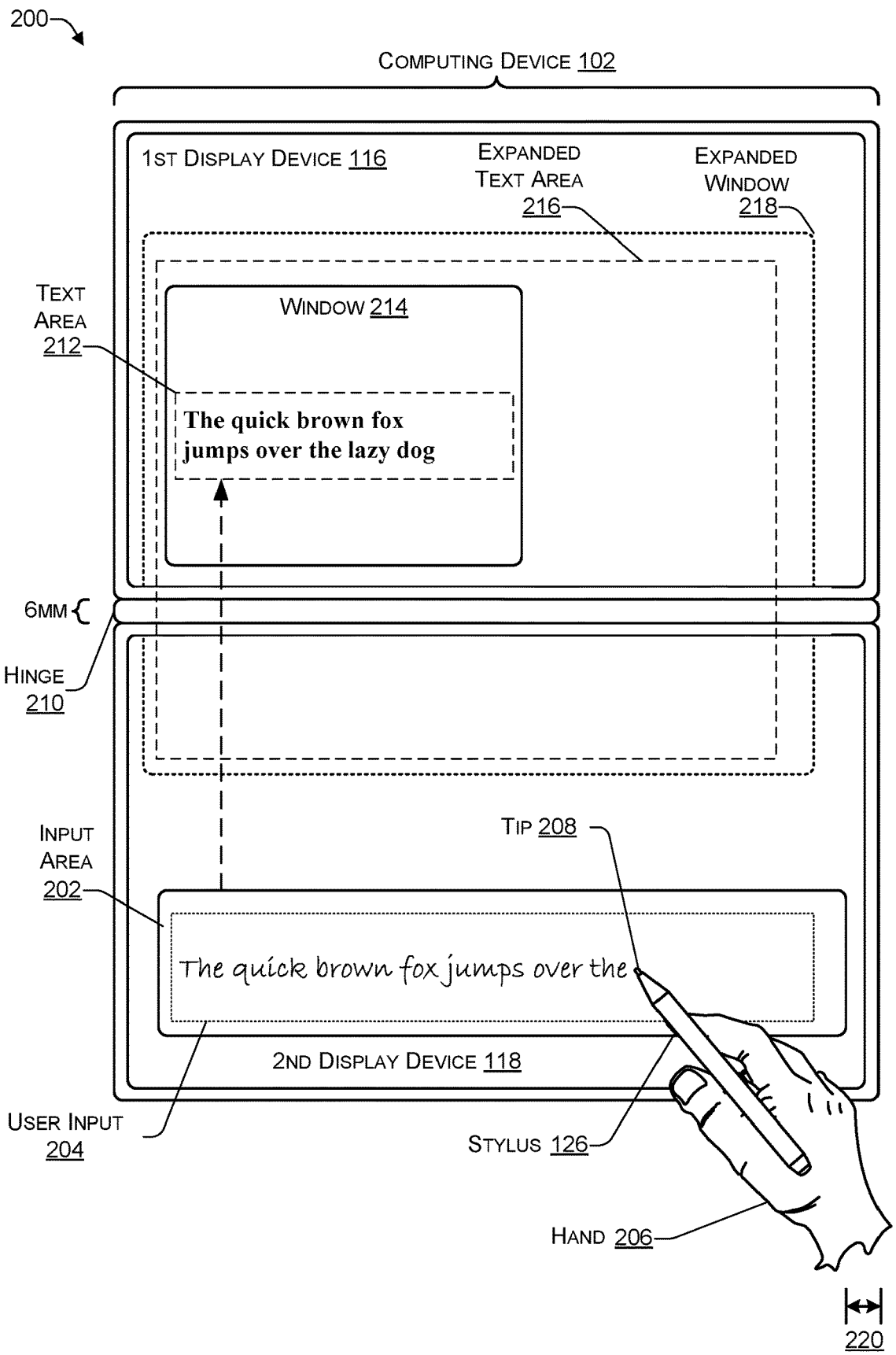
FIG. 2 is a block diagram of an architecture that includes a computing device in which an application window is separate from an input area according to some embodiments.

FIG. 2 is a block diagram of an architecture 200 that includes a computing device in which an application window is separate from an input area according to some embodiments. The architecture 200 illustrates how a component of the computing device 102 may receive input, convert the input into text, and insert the text into a window associated with an application, such as Microsoft® Word®.

An input area 202 may be displayed on one (or both) of the display devices 116, 118. The input area 202 may receive user input 204 from the stylus 126 that is being manipulated by a limb, such as a hand 206, of a user. For example, a tip 208 of the stylus 126 may be manipulated to provide the user input 204 in the input area 202. After the user has provided the user input 204, a component (e.g., an operating system) of the computing device 102 may automatically convert (e.g., using character recognition) the user input 204 into text and display the text in a text area 212. The text area 212 may be part of a window 214 associated with an application executing on the computing device 102. For example, the computing device 102 may use optical character recognition (OCR), or another similar technique, to convert the user input 204 into text that is displayed in the text area 212 of the window 214. In some cases, the user may specify a size and a location of the window 214 and a size and a location of the text area 212. The user may expand the window 214 to create an expanded window 218. The expanded window 218 may be located on the first display 116, the second display device 118, or may span both the display devices 116, 118. The user may expand the text area 212 to create the expanded text area 216. The expanded text area 216 may be located on the first display 116, the second display device 118, or may span both the display devices 116, 118. In some cases, the user may drag and drop the input area 202, the text area 212, or both from one display device to the other display device.

The first display device 116 may be coupled to the second display device 118 using a hinge 210. The hinge 210 may enable either of the first display device 116 or the second display device 118 to rotate between approximately zero degrees and approximately three hundred and sixty degrees relative to the other display device. The first display device 116 may be separated from the second display device 118 by between 1 to 6 mm.

Figure 3:
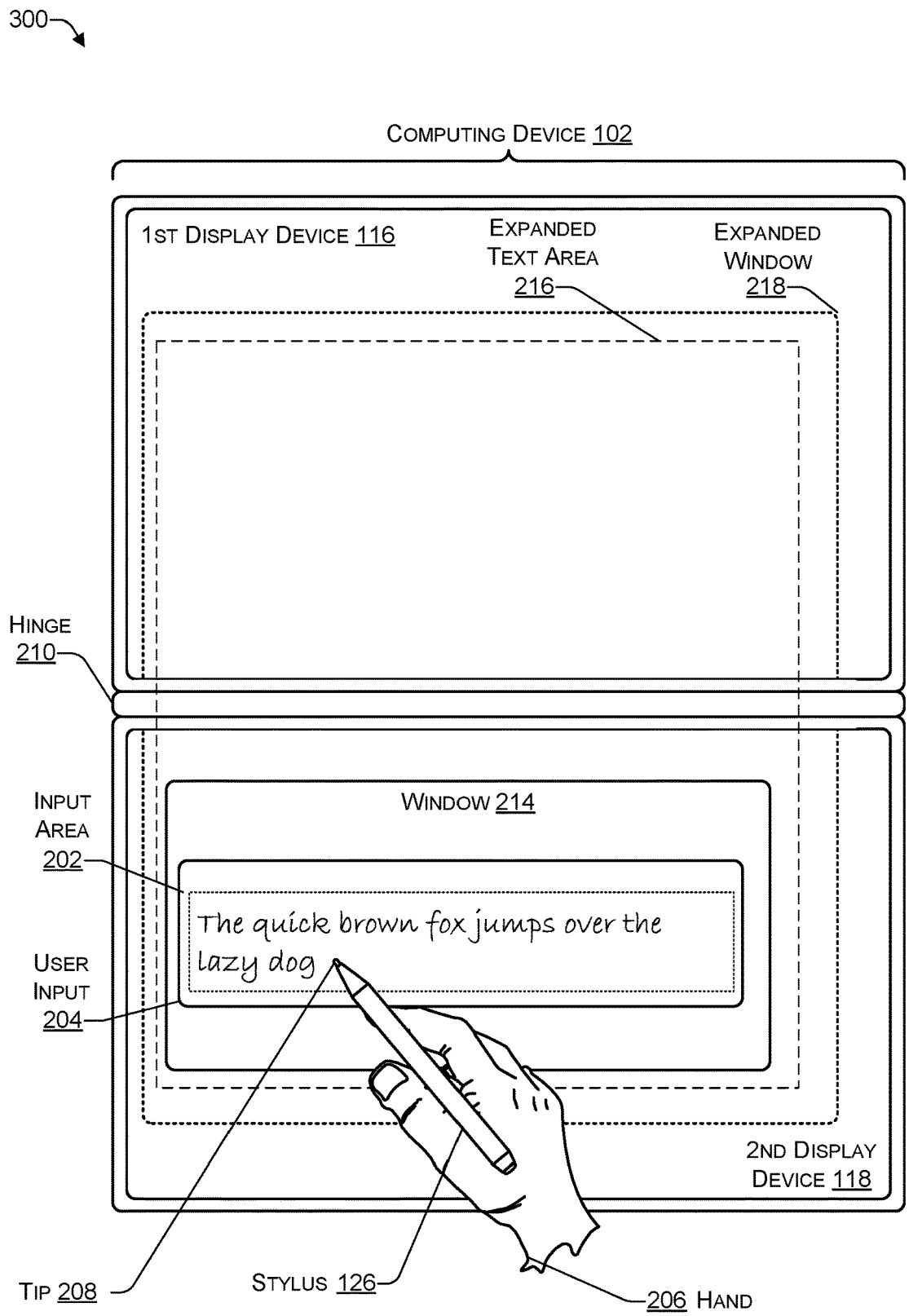
FIG. 3 is a block diagram of an architecture that includes a computing device in which an application window includes an input area according to some embodiments.

FIG. 3 is a block diagram of an architecture 300 that includes a computing device in which an application window includes an input area according to some embodiments. The architecture 300 illustrates how an application, such as Microsoft® OneNote®, may receive the user input 204 and store the user input 204, substantially in a same format as the user input 204 was received.

The user may provide the user input 204 into the input area 202. The window 214 may be associated with an application. The application may receive the user input 240 and store the user input 204 in a format substantially similar to the format in which the user input 204 was received, e.g., without converting the user input 204 into text as the user input 204 is being received in the input area 202. In some cases, after the application has stored the user input 204, the user may instruct the application to perform character recognition (e.g., OCR) to convert at least a portion of the stored user input 204 into text. For example, the user input 204 may include graphical illustrations or the like which may be stored without converting the graphical illustrations into text.

Figure 4:
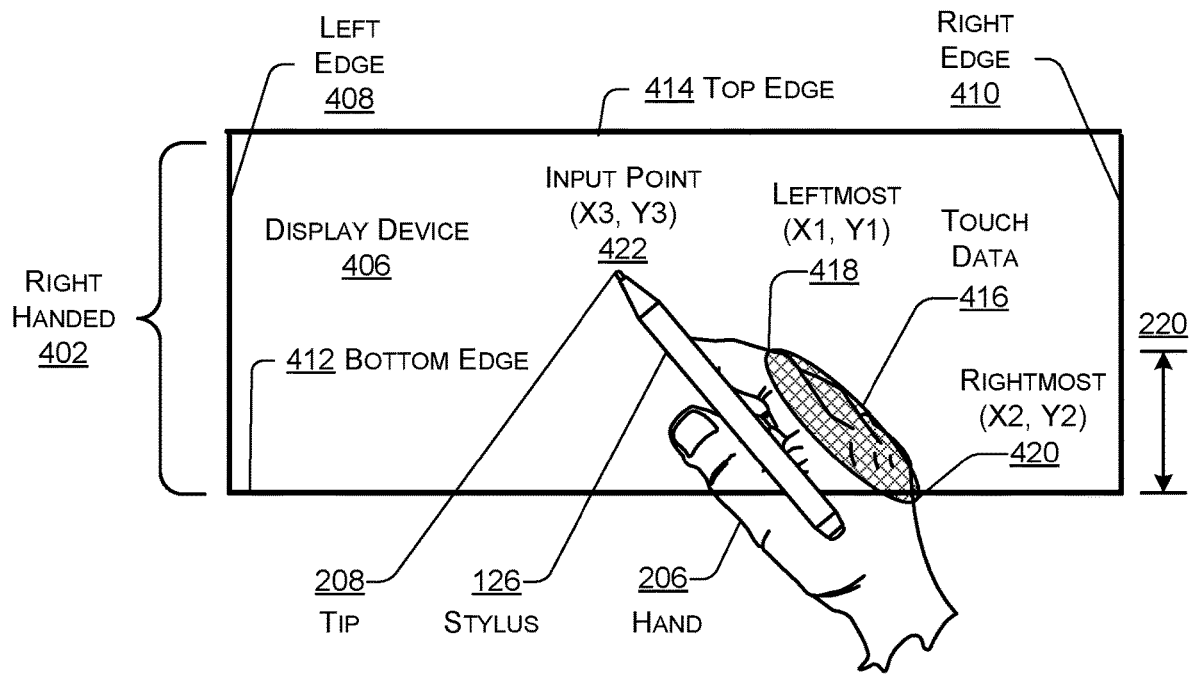
FIG. 4 is a block diagram illustrating determining a location of touch data relative to a tip of a stylus according to some embodiments.
Figure 4:
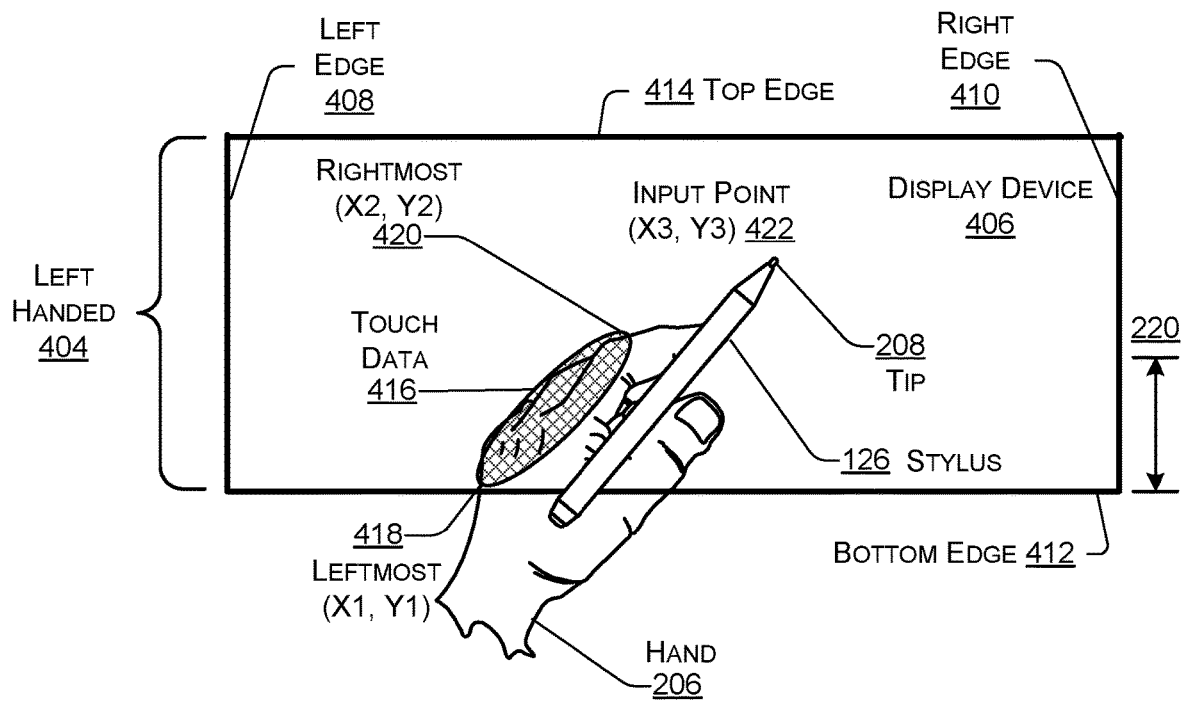

FIG. 4 is a block diagram illustrating determining a location of touch data relative to a tip of a stylus in the case of right handedness 402 and in the case of left handedness 404.

In the case of right handedness 402, the user may provide input using the stylus 126 on a display device 406. For example, the display device 406 may be one of the display devices 116 or 118 of FIG. 1, 2, or 3. The display device 406 may have a left edge 408, a right edge 410, a bottom edge 412, and a top edge 414. A touch sensor (e.g., one of the touch sensors 122 or 124 of FIG. 1) associated with the display device 406 may receive touch data 416 identifying a portion of the user's hand (or other limb) 206 that is resting on the display device 406. The touch data 416 may include multiple aggregated touch points.

The computing device 102 may determine various points associated with the touch data 416. The various points associated with the touch data 416 may be expressed as a pair of X and Y coordinates of the display device 406. The X coordinates may express a horizontal measurement while the Y coordinates may express a vertical measurement. For example, the computing device 102 may determine a leftmost point 418 having coordinates (X1, Y1) and a rightmost point 420 having coordinates (X2, Y2) associated with the touch data 416. The computing device 102 may determine an input point 422 having coordinates (X3, Y3) associated with the tip 208 of the stylus 126. In 402, the leftmost point 418 may be the highest point of the touch data 416 and the rightmost point 420 may be the lowest point of the touch data 416.

In the case of left handedness 404, the computing device 102 may determine the touch data 416 and one or more points associated with the touch data 416, such as the leftmost point 418 having coordinates (X1, Y1) and the rightmost point 420 having coordinates (X2, Y2) associated with the touch data 416. The computing device 102 may determine the input point 422 having coordinates (X3, Y3) associated with the tip 208 of the stylus 126. In 404, the leftmost point 418 may be the lowest point of the touch data 416 and the rightmost point 420 may be the highest point of the touch data 416.

Based on the information, such as the points 418, 420, gathered about the touch data 416, and the input point 422 associated with the stylus 126, the computing device 102 may determine whether the input is being received from a right-handed person or a left-handed person and store the handedness information in a user input profile. For example, if the leftmost point 418 is higher than the rightmost point 420, e.g., Y1>Y2, then the computing device 102 may determine that the user is right handed. If the leftmost point 418 is lower than the rightmost point 420, e.g., Y2>Y1, then the computing device 102 may determine that the user is left handed. The computing device 102 may determine an angle at which the user input 204 is being received in the input area 202 of FIG. 2. The angle of the user input 204 may be used to determine an angle at which to create a modified input area.

The computing device 102 may periodically (e.g., M times a second, where M>0) determine, based on the touch data 416, the input point 422, and one or more of the edges 408, 410, 412, 414, whether the user has sufficient room to rest the user's hand (or other limb) 206 while providing input using the stylus 126. For example, when X2 (e.g., the X-coordinate of the rightmost point 420) is within a predetermined distance 220 from the right edge 410 (e.g., indicating that a portion of the hand 206 or the stylus 126 will begin to move off the right edge 410), the computing device 102 may modify the input area 202 of FIG. 1 (e.g., by moving the input area 202 to the left) to enable the user to comfortably rest the user's hand 206 to provide additional user input using the stylus 126.

The computing device 102 may take into account one or more of the edges 408, 410, 412, 414 of the display device 406 when determining whether there is sufficient room for the user's hand 206 to rest on the display device 406. For example, when the smallest of Y1 and Y2 is within the predetermined distance 220 from the bottom edge 412 (e.g., indicating that a portion of the hand 206 will move off the bottom edge 412), the computing device 102 may modify the input area 202 (e.g., by moving the input area 202 up) to enable the user to comfortably rest the user's hand 206 to provide additional user input using the stylus 126. When the largest of Y1 and Y2 is within the predetermined distance 220 from the top edge 414 (e.g., indicating that a portion of the stylus 126 will move off the top edge 414), the computing device 102 may modify the input area 202 (e.g., by moving the input area 202 down) to enable the user to comfortably rest the user's hand 206 to provide additional user input using the stylus 126. When the smallest of X1 and X2 is within the predetermined distance 220 from the left edge 408 (e.g., indicating that a portion of the hand 206 or the stylus 126 will move off the left edge 408), the computing device 102 may modify the input area 202 (e.g., by moving the input area 202 to the right) to enable the user to comfortably rest the user's hand 206 to provide additional user input using the stylus 126.

Of course, the previous examples may be combined in various ways. For example, when X2 is within the predetermined distance 220 from the right edge 410 and the smallest of Y1 and Y2 is within the predetermined distance 220 from the bottom edge 412 (e.g., indicating that the hand 206 is close to the bottom right corner), the computing device 102 may move the input area 202 up and to the left. When X2 is within the predetermined distance 220 from the right edge 410 and the largest of Y1 and Y2 is within the predetermined distance 220 from the top edge 414 (e.g., indicating that the hand 206 is close to the top right corner), the computing device 102 may move the input area 202 down and to the left.

In some cases, the computing device 102 may make determinations similar to those discussed herein based on a formula that includes one or more of the points 418, 420, 422 and the distance to one or more of the edges 408, 410, 412, 414 to determine whether to modify the input, where to locate the modified input area, what size (e.g., length, width, or both) to make the modified input area, and what size to scale the contents of the input area. For example, the computing device 102 may calculate a horizontal midpoint= (X1+X2)/2 of the touch data 416. When the horizontal midpoint is within the predetermined distance 220 from the right edge 410 (e.g., indicating that approximately half of the hand 206 is supported while a remainder of the hand 206 is unsupported by the display device 406), then the computing device 102 may modify the input area (e.g., by moving the input area to the left). The computing device 102 may calculate a vertical midpoint=(Y1+Y2)/2 of the touch data 416. When the vertical midpoint is within the predetermined distance 220 from the bottom edge 412 (e.g., indicating that approximately half of the hand 206 is supported while a remainder of the hand 206 us unsupported by the display device 406), then the computing device 102 may modify the input area 202 (e.g., by moving the input area 202 up). Of course, this formula may be changed such that the computing device 102 modifies the input area 202 when a different fraction (e.g., one third, one quarter, or the like) of the hand 206 is unsupported. For example, for determining when one third of the hand 206 is unsupported, the computing device 102 may determine when $((X1+X2)/3) \times 2$ is within the predetermined distance 220 from one of the edges 408, 410, 412 414. For determining when one quarter of the hand 206 is unsupported, the computing device 102 may determine when $((X1+X2)/4) \times 3$ is within a predetermined distance from one of the edges 408, 410, 412 414, and so on.

Thus, a computing device may receive touch data from a touch sensor and determine one or more points associated with the touch data. When the computing device determines that one or more of the points of the touch data are within a predetermined distance from one or more of the edges of the display device, the computing device may modify the input area and display a modified input area to receive additional input. The computing device 102 may use multiple predetermined distances when determining when to create the modified input area. For example, a first predetermined distance may be used between one or more points of the touch data 416 and the left edge 408, a second predetermined distance may be used between one or more points of the touch data 416 and the right edge 410, a third predetermined distance may be used between one or more points of the touch data 416 and the bottom edge 412, a fourth predetermined distance may be used between one or more points of the touch data 416 and the top edge 414, and so on.

Figure 5:
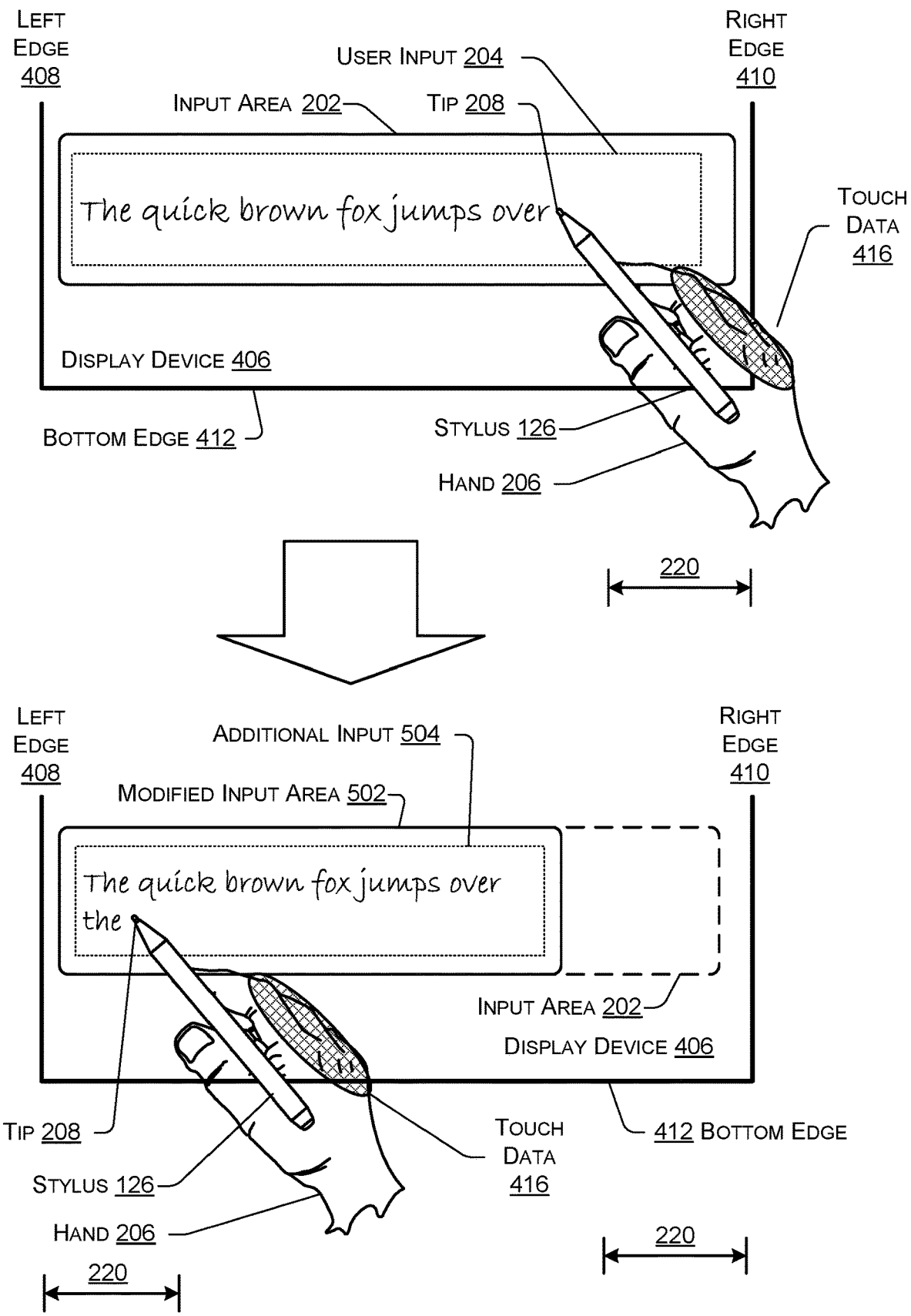
FIG. 5 is a block diagram illustrating creating a modified input area according to some embodiments.

FIG. 5 is a block diagram illustrating creating a modified input area according to some embodiments. The computing device 102 may determine that the user is providing right handed input based on the touch data 416 and data received from other sensors. The computing device 102 may determine that the leftmost point of the touch data 416 is within a predetermined distance from the right edge 410. In response, the computing device 102 may modify the input area 202, as illustrated to create a modified input area 502. The modified input area 502 may enable the user to comfortably rest the hand 206 to provide additional input 504. The modified input area 502 may be positioned such that a distance from the leftmost point of the touch data 416 to the right edge 410 is greater than the predetermined distance from the right edge 410 of the display device 406. The modified input area 502 may be located at a different location relative to the original input area 202. The modified input area 502 may have a different size (e.g., different length, different width, or both) as compared to the original input area 202. The modified input area 502 may display input at a different size as compared to input displayed in the original input area 202. For example, the modified input area 502 may display input in a smaller (e.g., 16) font as compared to an original (e.g., 18) front of input displayed in the original input area 202. Further examples of how the modified input area 502 may be displayed are provided in FIGS. 6, 7, and 8.

Figure 6:
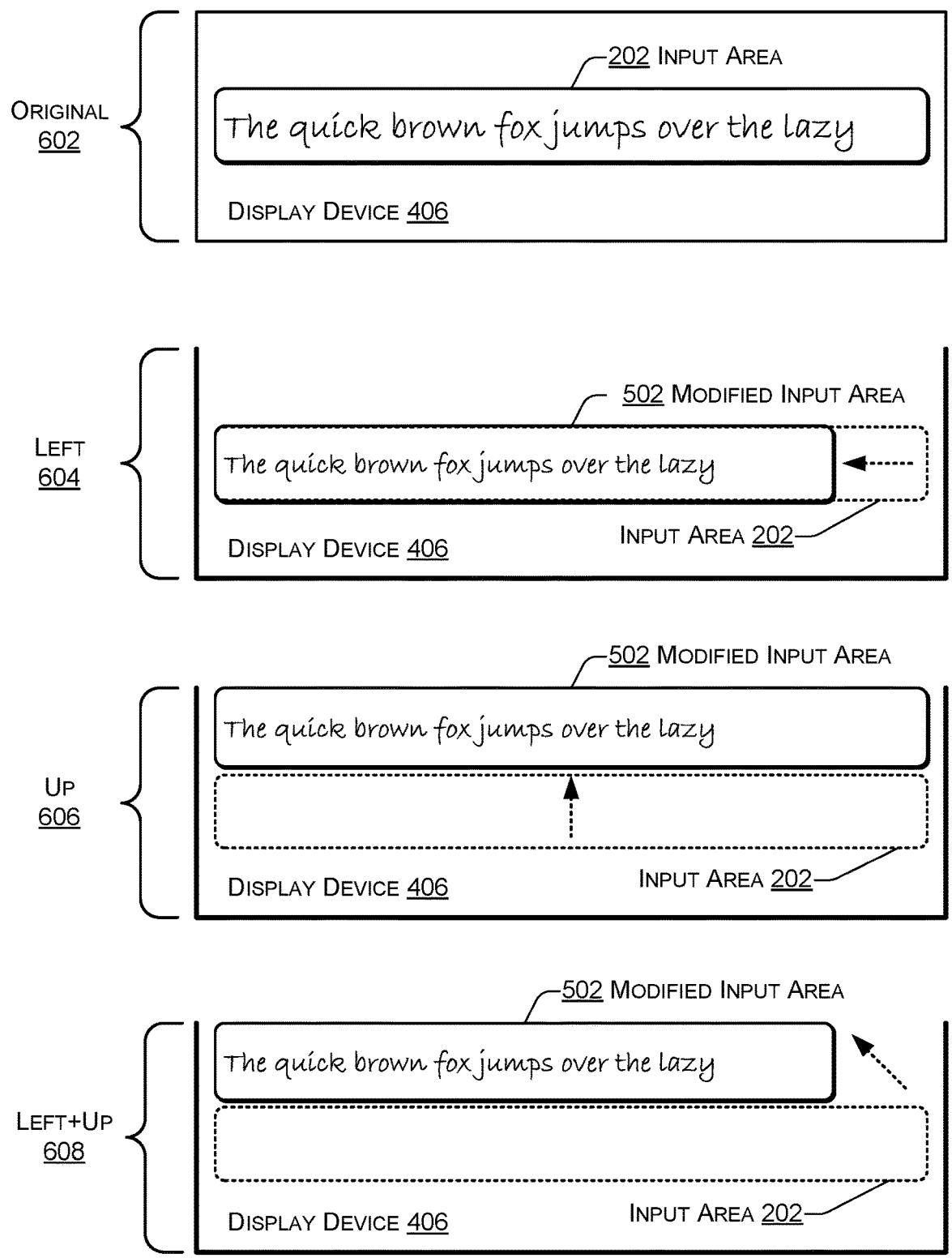
FIG. 6 is a block diagram illustrating displaying a modified input area, including moving the modified input area up and to the left, according to some embodiments.

FIG. 6 is a block diagram illustrating displaying a modified input area including moving the modified input area up and to the left according to some embodiments. The input area 202 may be displayed at an original location 602. In some cases, the modified input area 502 may be smaller in size and located to a left 604 of the original location 602. In some cases, the modified input area 502 may be located up 606 relative to the original location 602. In some cases, the modified input area 502 may be smaller in size and located (diagonally positioned) left and up relative to the original location 602. The modified input area 502 may display input with a smaller size (e.g., font) as compared to the input displayed in the original input area 202.

Figure 7:
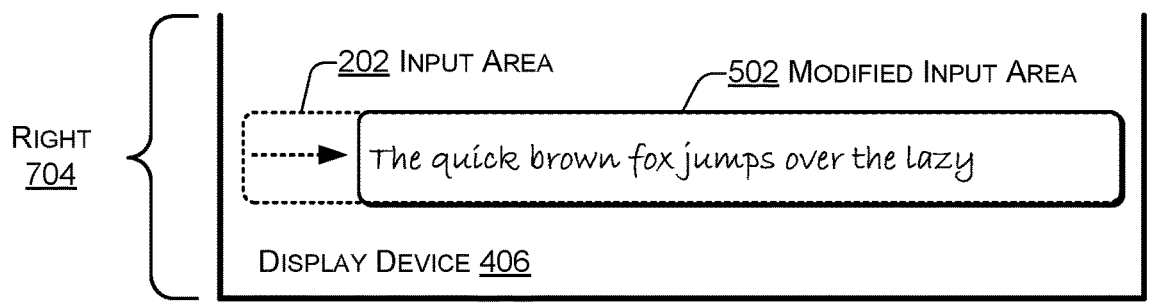
FIG. 7 is a block diagram illustrating displaying a modified input area, including moving the modified input area up and to the right, according to some embodiments.
Figure 7:
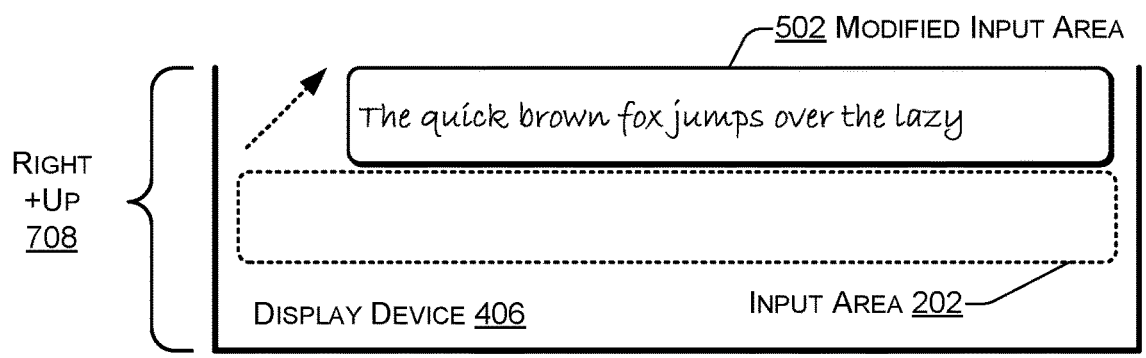
Figure 7:
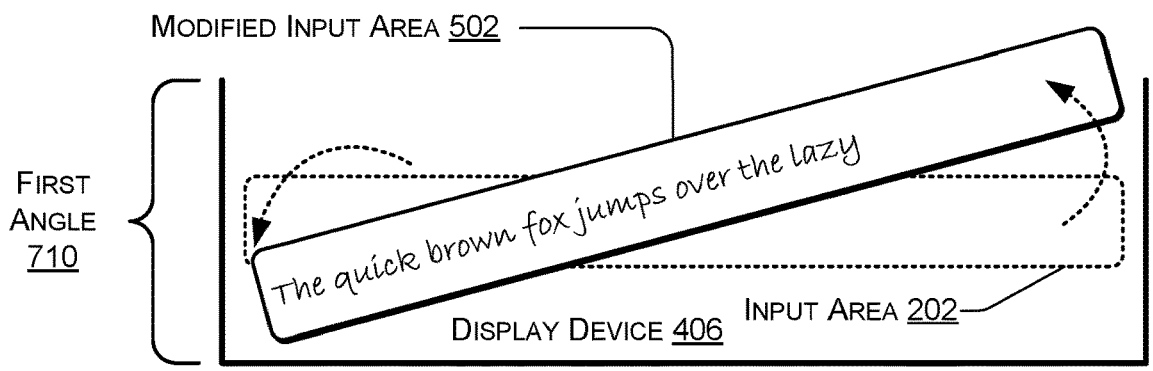
Figure 7:
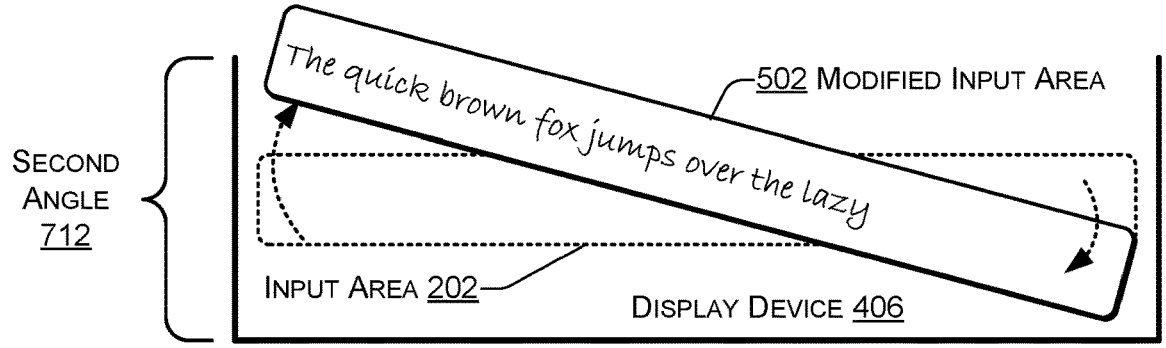

FIG. 7 is a block diagram illustrating displaying a modified input area, including moving the modified input area up and to the right, according to some embodiments. For example, in some cases, the modified input area 502 may be smaller in size and located to a right 704 of the original input area 202. In some cases, the modified input area 502 may be smaller in size located right and up 708 relative to the original input area 202. The modified input area 502 may display input with a smaller size (e.g., font) as compared to the input displayed in the original input area 202.

The modified input area 502 may be rotated at a first angle 710 relative to the original input area 202. For example, the computing device 102 may determine an angle at which the user is providing input, e.g., based on a tilt sensor in the stylus 126. The computing device 102 may determine an angle associated with the touch data 416 of FIG. 4 and determine the first angle 710 based on the touch data 416. In some cases, the modified input area 502 may display input with a smaller size (e.g., font) as compared to the input displayed in the original input area 202. The modified input area 502 may be rotated at a second angle 712 relative to the original input area 202. For example, the computing device 102 may determine an angle at which the user is providing input, e.g., based on a tilt sensor in the stylus 126. The computing device 102 may determine the second angle 712 based on determining an angle associated with the touch data 416. In some cases, the modified input area 502 may display input with a smaller size (e.g., font) as compared to the input displayed in the original input area 202.

Figure 8:
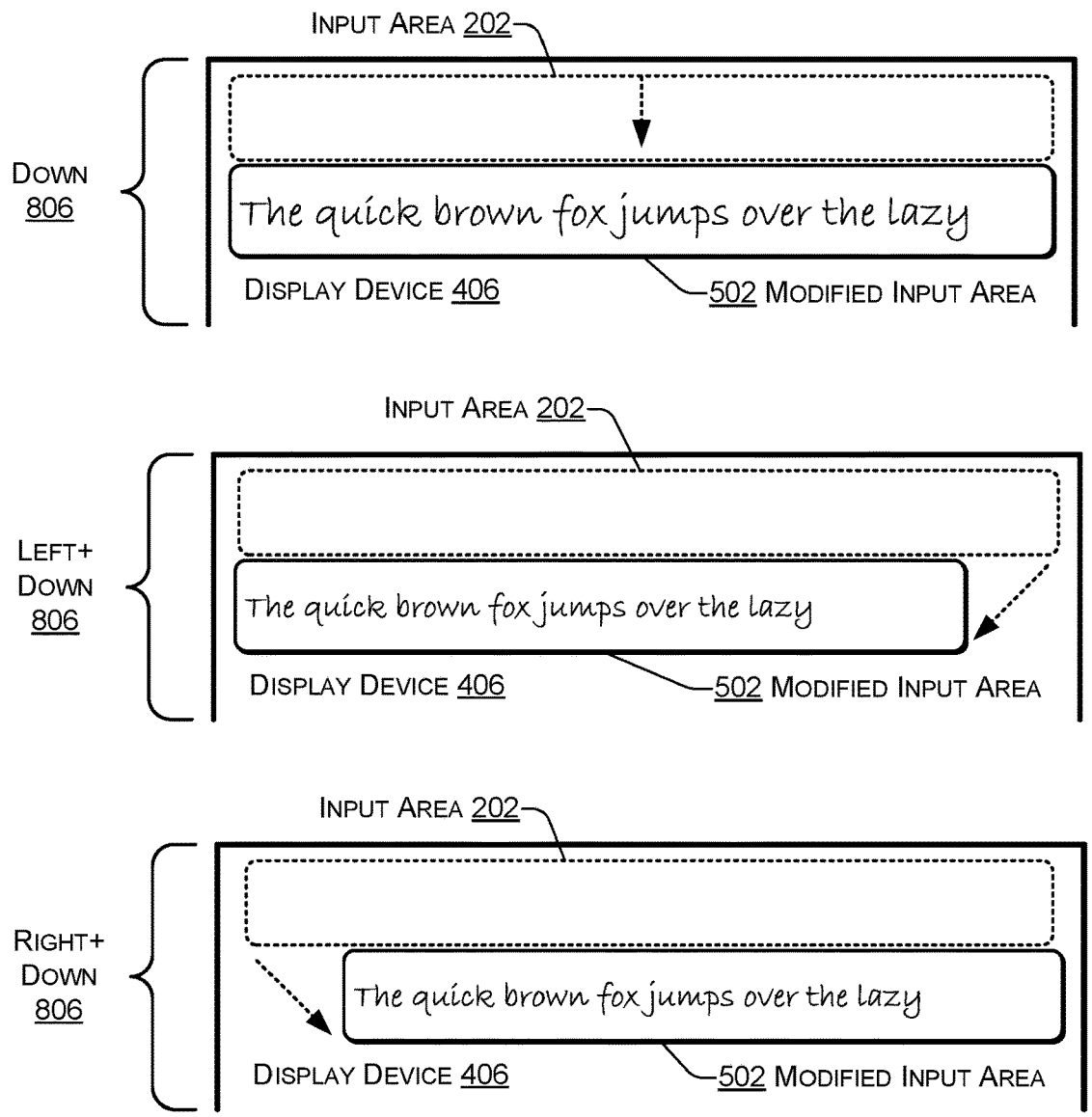
FIG. 8 is a block diagram illustrating displaying a modified input area, including moving the modified input area down, according to some embodiments.

FIG. 8 is a block diagram illustrating displaying a modified input area, including moving the modified input area down, according to some embodiments. For example, in some cases, the modified input area 502 may be positioned down 806 relative to the original input area 202. In some cases, the modified input area 502 may be located left and down (diagonally positioned) relative to the original input area 202. In some cases, the modified input area 502 may be located right and down 806 (diagonally located) relative to the original input area 202. The modified input area 502 may display input with a smaller size (e.g., font) as compared to the input displayed in the original input area 202.

Figure 9:
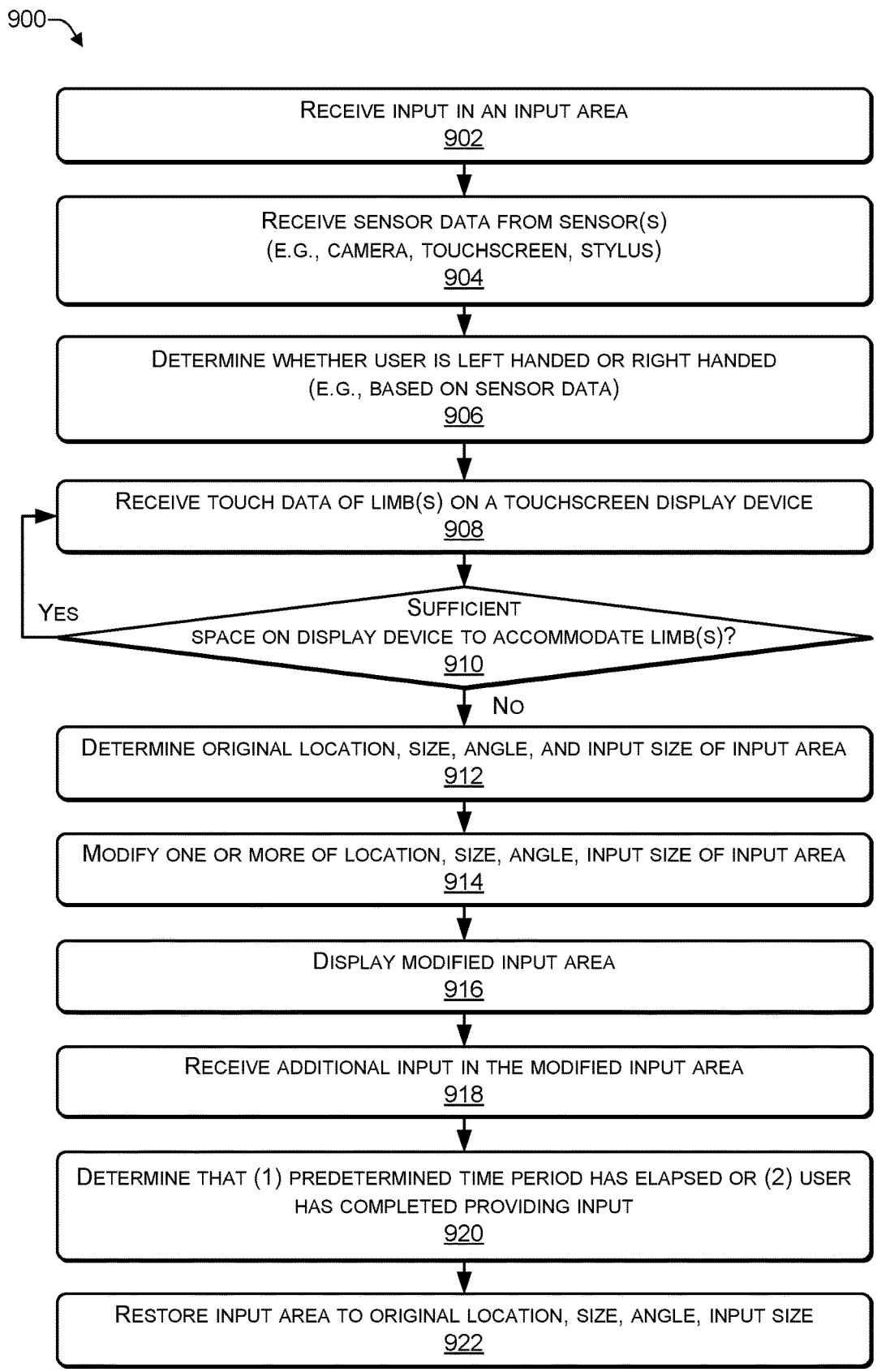
FIG. 9 is a flowchart of a process that includes displaying a modified input area according to some embodiments.

In the flow diagram of FIG. 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 900 is described with reference to FIG. 1, 2, 3, 4, 5, 6, 7, or 8 as described above, although other models, frameworks, systems and environments may be used to implement the process.

FIG. 9 is a flow chart of a process 900 that includes displaying a modified input area according to some embodiments. For example, the process 900 may be performed by one or more components of the computing device 102.

At 902, input may be received in an input area. For example, in FIG. 2, the user input 204 may be received in the input area 202 when the user manipulates the stylus 126 in the input area 202.

At 904, sensor data may be received from one or more sensors. For example, in FIG. 1, the handedness module 140 may receive the data 120(1) to 120(N) from one or more sensors associated with the computing device 102, including the touch sensors 122, 124, the stylus 126, the image sensor 128, and the other sensors 136.

At 906, a determination may be made whether the user is left-handed or right-handed (e.g., based on the data from the one or more sensors). For example, in FIG. 1, the handedness module 140 may determine whether the input being received is from a right-handed person or a left-handed person based on the data 120(1) to 120(N). The information about handedness may be stored in a user input profile.

At 908, touch data may be received associated with one or more limbs (e.g., one or more fingers and/or a portion of a wrist or a hand) touching a portion of a touch screen display device. For example, in FIG. 4, the touch data 416 may be received from a touch sensor associated with the touchscreen display device 406. The touch data 416 may be associated with a portion of the hand (or other limb) 206 that is resting on the display device 406.

At 910, a determination may be made whether there is sufficient space on the display device to accommodate the limb(s). In response to determining, at 910, that "yes" there is sufficient space on the display device to accommodate the limbs, the process proceeds to 908 where additional touch data is received as the user continues to provide input in the input area. In response to determining, at 910, that "no" there is not sufficient space on the display device to accommodate the limbs, the process proceeds to 912. For example, in the case of the right handedness 402, when X1 or X2 is within a predetermined distance from the right edge 410, the computing device 102 may determine that if the user continues to provide input, there will be insufficient space on the display device to support the user's hand 206. In response, the computing device 102 may create the modified input area 502 of FIG. 5, 6, 7, or 8.

At 912, an original location, size, angle, and input size of an input area may be determined. For example, in FIG. 2, the computing device 102 may determine a location of the input area 202, a size of the input area 202, a size (e.g., font or scaling) of the input in the user input 204, or any combination thereof.

At 914, one or more of the location, size, angle, or input size of the input area may be modified to create the modified input area. For example, in FIG. 5, 6, 7, or 8, the original input area 202 may be modified to create the modified input area 502. The modified input area 502 may have a location that is different from the original input area 202. The modified input area 502 may have a size that is different from the original input area 202. The modified input area 502 may be at a non-horizontal angle that is different from the original (e.g., horizontal) angle of the input area 202. The modified input area 502 may have input that is displayed using a different size (e.g., font or scaling) as compared to the original input area 202. In some cases, the modified input area 502 be located on a different display device as compared to the original input area 202. For example, the input area 202 may be located on a first display device and the modified input area 502 may be located on a second display device. Alternately, the input area 202 may be located on a second display device and the modified input area 502 may be located on a first display device.

At 916, the modified input area may be displayed. At 918, additional input may be received in the modified input area. At 920, a determination may be made whether a predetermined time period has elapsed or the user has completed providing input. At 922, the input area may be restored to the original location, original size, original angle, or original input size (e.g., as determined at 912). For example, in FIG. 5, 6, 7, or 8, the modified input area 502 may be displayed instead of displaying the input area 202. Additional input may be received in the modified input area 502. The computing device 102 may determine that a predetermined period of time has elapsed and display the original input area 202 instead of the modified input area 502. The computing device 102 may determine that the user has completed providing input and display the original input area 202 instead of the modified input area 502. For example, the computing device 102 may determine that the user has completed providing input by determining that the user has lifted the tip 208 of the stylus 126 off of the display device 406.

Thus, a component of a computing device may receive input in an input area. While the input is being received, the computing device may receive sensor data from one or more sensors and determine handedness of the input based on the sensor data. The component may receive touch data associated with a portion of a hand (or other limb) that is resting on a touchscreen display device. For example, the touch data may be sent by a touch sensor associated with the touchscreen display device. The component may determine, based on one or more points of the touch data and a current rate of input, whether the hand (or other limb) is likely to have sufficient support to provide additional input. In response to determining that the hand is likely to have insufficient support, the component may create and display a modified input area instead of the original input area. The modified input area may have one or more of a different location, a different size, a different angle, or different sized input as compared to the original input area. The modified input area may be used to receive additional input. After the component has determined that a predetermined amount of time has elapsed or the user has completed providing the additional input, the component may re-display the original input area and stop displaying the modified input area.

Figure 10:
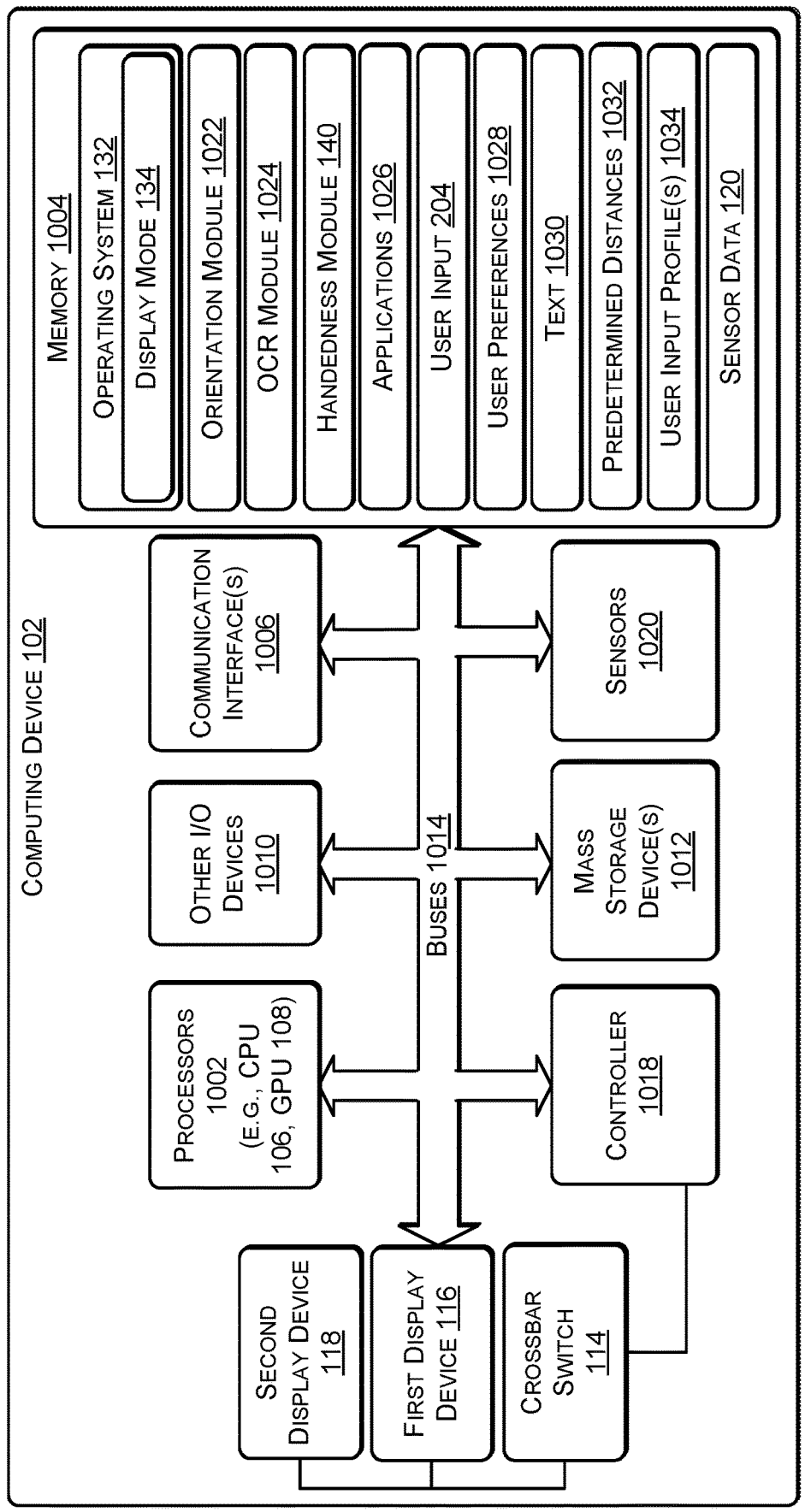
FIG. 10 illustrates an example configuration of a computing device that can be used to implement the systems and techniques described herein.

FIG. 10 illustrates an example configuration of the computing device 102 described above that can be used to implement the systems and techniques described herein. The computing device 102 may include one or more processors 1002 (e.g., the CPU 106 and the GPU 108 of FIG. 1), memory 1004, communication interfaces 1006, the display devices 116 and 118, other input/output (I/O) devices 1010 (e.g., the stylus 126), and one or more mass storage devices 1012, configured to communicate with each other, such as via one or more system buses 1014 or other suitable connection. While a single bus is illustrated for ease of understanding, it should be understood that the system buses 1014 may include multiple buses, such as memory device buses, storage device buses, power buses, video signal buses, and the like.

The processors 1002 are one or more hardware devices that may include a single processing unit or a number of processing units, all of which may include single or multiple computing units or multiple cores. The processors 1002 may include an integrated GPU or the GPU a separate processor device. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of non-transitory computer media (e.g., memory storage devices) for storing instructions that can be executed by the processors 1002 to perform the various functions described herein. For example, memory 1004 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be a media capable of storing computer-readable, processor-executable program instructions as computer program code that can be executed by the processor 1002 as a particular machine configured for carrying out the operations and functions described in the implementations herein.

The computing device 102 may also include one or more communication interfaces 1006 for exchanging data via a network with other computing devices. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1006 can also provide communication with external storage (not shown), such as in a storage array, network attached storage, storage area network, or the like.

The display devices 116, 118 may be connected to each other using a hinge (e.g., the hinge 210 of FIG. 2) that enables each display device to rotate between approximately zero degrees and approximately three hundred and sixty degrees relative to the other display device. The display devices 116, 118 may be used for displaying information and images to users. Other I/O devices 1010 may be devices that receive various inputs from a user and provide various outputs to the user, and may include the stylus 126, a keyboard, a remote controller, a mouse, a printer, audio input/output devices, and so forth. A controller 1018 may select a particular routing configuration of the crossbar switch 114. For example, the routings may select whether an output of an embedded DisplayPort (eDP) is sent to one or both display devices 116, 118 and whether an output of a DisplayPort (DP) is sent to one or both display devices 116, 118. The computing device 102 may include one or more sensors 1020, such as, for example, an accelerometer, a gyroscope, a magnetometer or a magnetic compass, a proximity sensor, a camera, or another type of sensor.

The computer storage media, such as memory 1004 and mass storage devices 1012, may be used to store software and data. For example, the computer storage media may be used to store the operating system 132, an orientation module 1022 to determine an orientation (e.g., landscape, portrait, tablet, and the like) of the computing device 102, an optical character recognition (OCR) module 1024 to recognize characters in the input 204, one or more software applications (e.g., Word®, OneNote®, and the like) 1026, the user input 204, user preferences 1028 (e.g., specifying handedness), text 1030 that is placed in the text area 212, one or more predetermined distances 1032 used to determine when to create the modified input area 502, one or more user input profiles 1034 (e.g., each of the user input profiles 1034 identifying a handedness of each user of the computing device 102), and the sensor data 120. The operating system 132 may have the associated display mode 134. For example, the operating system 132, such as Microsoft® Windows®, may provide three display modes 134: (a) extended desktop mode where the display devices 116, 118 behave as a single display device, (b) clone mode where each of the display devices 116, 118 display the same content, or (c) single display mode, e.g., in which one of the display devices 116, 118 is off or blank and therefore not displaying any content.

Thus, a component (e.g., the handedness module 140) of a computing device 102 may receive the user input 204 in the input area 202. For a portion of the time during which the user input 204 is being received, the component may receive the sensor data 120 and determine a handedness of the user input 204 based on the sensor data 120. The component may receive the touch data 416 associated with a portion of the hand (or other limb) 206 that is resting on the touchscreen display device 406. For example, the touch data 416 may be sent by a touch sensor (e.g., one of the touch sensors 122, 124) associated with the touchscreen display device (e.g., one of the display devices 116, 118). The component may determine, based on one or more points of the touch data 415 and a current rate of input, whether the hand (or other limb) 206 is likely to have sufficient support to provide additional input. In response to determining that the hand 206 is unlikely to have sufficient support (e.g., at least one of the points of the touch data 416 is within a predetermined distance from one of the edges 408, 410, 412, 414 of the display device 406), the component may create and display the modified input area 502 instead of the original input area 202. The modified input area 502 may have one or more of a different location, a different size, a different angle, or different sized input as compared to the original input area 202. The modified input area 502 may be used to receive additional input. After the component has determined that a predetermined amount of time has elapsed or has determined that the user has completed providing the additional input, the component may re-display the original input area 202 and stop displaying the modified input area 502.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre- scribed functions. For instance, in the case of a software implementation, the term "module," "mechanism" or "com- ponent" can represent program code (and/or declarative- type instructions) that performs specified tasks or operations when executed on a processing device or devices (e.g., CPUs or processors). The program code can be stored in one or more computer-readable memory devices or other com- puter storage devices. Thus, the processes, components and modules described herein may be implemented by a com- puter program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this imple- mentation," "these implementations" or "some implemen- tations" means that a particular feature, structure, or char- acteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by a computing device, input in an input area displayed on a touchscreen display device of the com- puting device, the input rendered on the touchscreen display device;
   receiving, by the computing device, touch data identifying where a hand of a user is touching a portion of the touchscreen display device, the touch data including a leftmost point having a first pair of coordinates and a rightmost point having a second pair of coordinates;
   determining, by the computing device, a handedness of the user based on the touch data;
   determining, by the computing device, that at least one point of the touch data is within a predetermined distance from an edge of the touchscreen display device, wherein the predetermined distance is calcu- lated as a fraction of a size of the hand of the user, and wherein the size of the hand is determined based on the touch data when the hand is fully supported by the touchscreen display device;
   modifying, by the computing device, the input area to create a modified input area based on the determining that the at least one point of the touch data is within the predetermined distance;
   displaying, by the computing device, the modified input area on the touchscreen display device; and
   receiving, by the computing device, additional input in the modified input area.

2. The method of claim 1, further comprising:
   determining, based on a comparison between the leftmost and the rightmost point, that the input is being provided by a right-handed user;
   determining, by the computing device, that the input area is near a bottom of the touchscreen display device; and
   positioning, by the computing device the modified input area relative to the input area to the:
   left of the input area;
   up from the input area;
   both left and up from the input area; or
   at a first angle relative to the input area.

3. The method of claim 1, further comprising:
   determining, based on a comparison between the leftmost and the rightmost point, that the input is being provided by a left-handed user;
   determining, by the computing device, that the input area is at a bottom of the touchscreen display device; and
   positioning, by the computing device, the modified input area relative to the input area to the:
      right of the input area;
      up from the input area;
      both right and up from the input area; or
      at a second angle relative to the input area.
4. The method of claim 1, further comprising:
   determining, based on the touch data, that the input is being provided by a right-handed user;
   determining, by the computing device, that the input area is at a top of the touchscreen display device; and
   positioning by the computing device, based on the determining that the input area is at the top of the touchscreen display device, the modified input area relative to the input area to the:
      left of the input area;
      down from the input area;
      both left and down from the input area; or
      at a first angle relative to the input area.
5. The method of claim 1, wherein modifying the input area to create the modified input area comprises modifying:
   a size of characters displayed in the input area;
   an angle of the input area;
   a location of the input area;
   a size of the input area; and
   a location of the input area.
6. The method of claim 1, further comprising:
   determining, based on the touch data, that the input is being provided by a left-handed user;
   determining, by the computing device, that the input area is at a top of the touchscreen display device; and
   positioning by the computing device, based on the determining that the input area is at the top of the touchscreen display device, the modified input area relative to the input area to the:
      right of the input area;
      down from the input area;
      both right and down from the input area; or
      at a second angle relative to the input area.
7. The method of claim 1, further comprising:
   determining that the user has completed providing the additional input; and
   displaying the input area instead of the modified input area.
8. A computing device comprising:
   a touchscreen display device;
   one or more processors;
   one or more non-transitory computer-readable media storing instructions executable by the one or more processors to perform operations comprising:
      receiving input in an input area displayed on the touchscreen display device, the input rendered on the touchscreen display device;
      receiving touch data identifying where a hand of a user is touching a portion of the touchscreen display device, wherein the touch data includes a leftmost point having a first pair of coordinates and a rightmost point having a second pair of coordinates;
      determining, by the computing device, a handedness of the user based on the touch data;
      determining that at least one point of the touch data is within a predetermined distance from an edge of the touchscreen display device, wherein the predetermined distance is calculated as a fraction of a size of the hand of the user, and wherein the size of the hand is determined based on the touch data when the hand is fully supported by the touchscreen display device;
      modifying, based on the determining that the at least one point of the touch data is within the predetermined distance, the input area to create a modified input area;
      displaying the modified input area on the touchscreen display device; and
      receiving additional input in the modified input area.
9. The computing device of claim 8, further comprising:
   a second touchscreen display device that is approximately a same size and shape as the touchscreen display device; and
   a hinge attaching the second touchscreen display device to the touchscreen display device, wherein the hinge enables the second touchscreen display device to rotate between approximately zero and approximately three hundred and sixty degrees relative to the touchscreen display device, wherein the touchscreen display device and the second touchscreen display device are configured to render one of:
      the input area on the touchscreen display device or the second touchscreen display device;
      the input in a text area that is included within a window that is associated with an application that is executed on the computing device; or
      the input area on the touchscreen display device and the modified input area on the second touchscreen display device.
10. The computing device of claim 8, wherein the operations further comprise:
   receiving sensor data from at least one of an image sensor, a touch sensor associated with the touchscreen display, or a tilt sensor associated with a stylus; and
   determining a handedness of the input based at least in part on the sensor data.
11. The computing device of claim 8, wherein the modified input area is located at a different location than the input area; and wherein the modified input area has at least one of a different length, a different width, or a different angle as compared to the input area.
12. The computing device of claim 8, wherein the modified input area has at least one of a different length, a different width, or a different angle as compared to the input area, and wherein the input is rendered in the modified input area.
13. The computing device of claim 8, wherein the touch data includes:
   a first point that is closest to a tip of a stylus; and
   a second point that is furthest from the tip of the stylus, further comprising:
      comparing a first value of the first point to a second value of the second point; and
      determining a handedness of the input based at least in part on a determination of a smaller value between the first value and the second value.
14. One or more non-transitory computer-readable media storing instructions that are executable by one or more processors to perform operations comprising:

receiving input in an input area displayed on a touchscreen display device of a computing device, the input rendered on the touchscreen display device;

receiving touch data identifying where a hand of a user is touching a portion of the touchscreen display device, the touch data including a leftmost point having a first pair of coordinates and a rightmost point having a second pair of coordinates;

determining, by the computing device, a handedness of the user based on the touch data;

determining that at least one point of the touch data is within a predetermined distance from an edge of the touchscreen display device, wherein the predetermined distance is calculated as a fraction of a size of the hand of the user, and wherein the size of the hand is determined based on the touch data when the hand is fully supported by the touchscreen display device;

modifying, based on the determining that the at least one point of the touch data is within the predetermined distance, the input area to create a modified input area;

displaying the modified input area on the touchscreen display device; and receiving additional input in the modified input area.

15. The one or more non-transitory computer-readable media of claim 14, wherein the first pair of coordinates include a first coordinate that indicates a first value of a first distance from a horizontal bottom edge of the touchscreen display device; and wherein the second pair of coordinates include a second coordinate that indicates a second value of a second distance from the horizontal bottom edge of the touchscreen display device, further comprising:

comparing the first coordinate to second coordinate;

determining that the user is right-handed in response to determining the first coordinate is greater than the second coordinate; and determining that the user is left-handed in response to determining the first coordinate is less than the second coordinate.

16. The one or more non-transitory computer-readable media of claim 14, further comprising:

determining a tip location of a tip of a stylus;

determining a touch location of the at least one point of the touch data;

determining that the user is right-handed in response to determining that the tip location is to the left of the touch location; and determining that the user is left-handed in response to determining that the tip location is to the right of the touch location, wherein when receiving the additional input in the modified input area, the at least one point of the touch data is greater than the predetermined distance from the edge of the touchscreen display device.

17. The one or more non-transitory computer-readable media of claim 14, wherein modifying the input area to create the modified input area comprises modifying at least one of:

a size of characters displayed in the input area;

an angle of the orientation of the input area, wherein the modified angle of the input area changes the orientation of the input;

a location of the input area; or a size of the input area.

18. The one or more non-transitory computer-readable media of claim 14, the operations further comprising:

determining that either a predetermined period of time has elapsed or the user has completed providing the additional input; and displaying the input area instead of the modified input area.

19. The one or more non-transitory computer-readable media of claim 18, further comprising:

determining the handedness of the user based on a first point and a second point, wherein the touch data includes:

the first point that is closest to a tip of the stylus; and the second point that is furthest from the tip of the stylus.

20. The one or more non-transitory computer-readable media of claim 14, wherein the touch data identifies a location where a portion of a hand of a user is touching the touchscreen display device when providing the input.

* * * * *